March 5, 1963  F. G. LAMB  3,080,187
VINER TRUCK BODY

Filed Nov. 25, 1960  5 Sheets-Sheet 1

INVENTOR
Frank G. Lamb

BY *Thomas, Weisman & Russell*
ATTORNEYS

March 5, 1963 F. G. LAMB 3,080,187
VINER TRUCK BODY
Filed Nov. 25, 1960 5 Sheets-Sheet 2

INVENTOR
Frank G. Lamb

BY Thomas, Weisman & Russell
ATTORNEYS

INVENTOR
Frank G. Lamb

March 5, 1963 F. G. LAMB 3,080,187
VINER TRUCK BODY
Filed Nov. 25, 1960 5 Sheets-Sheet 4
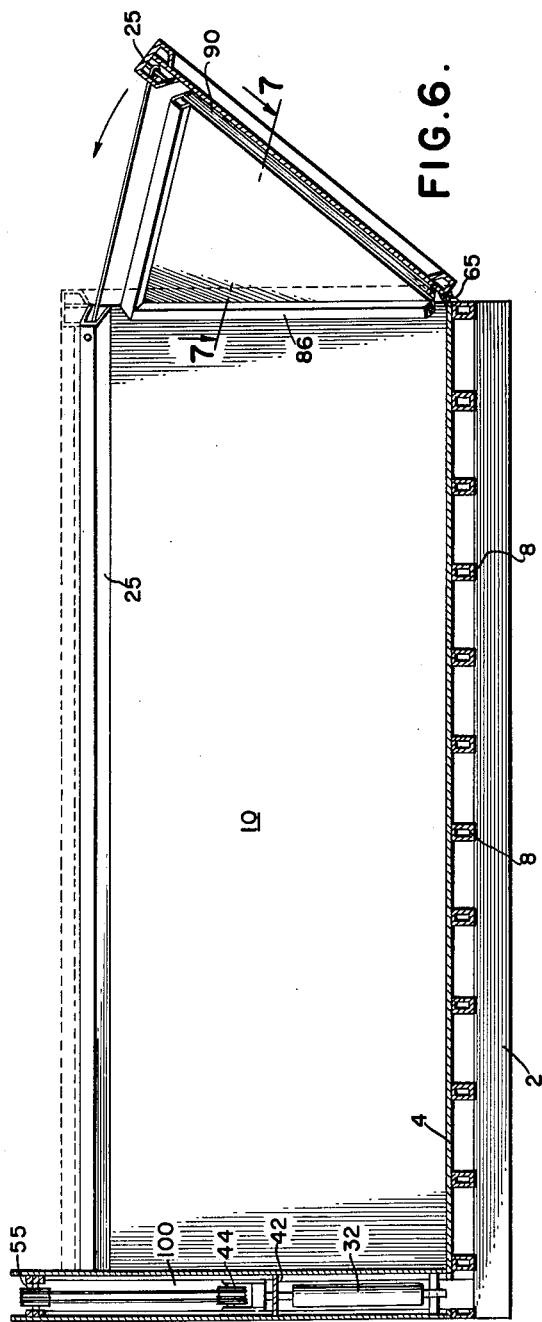
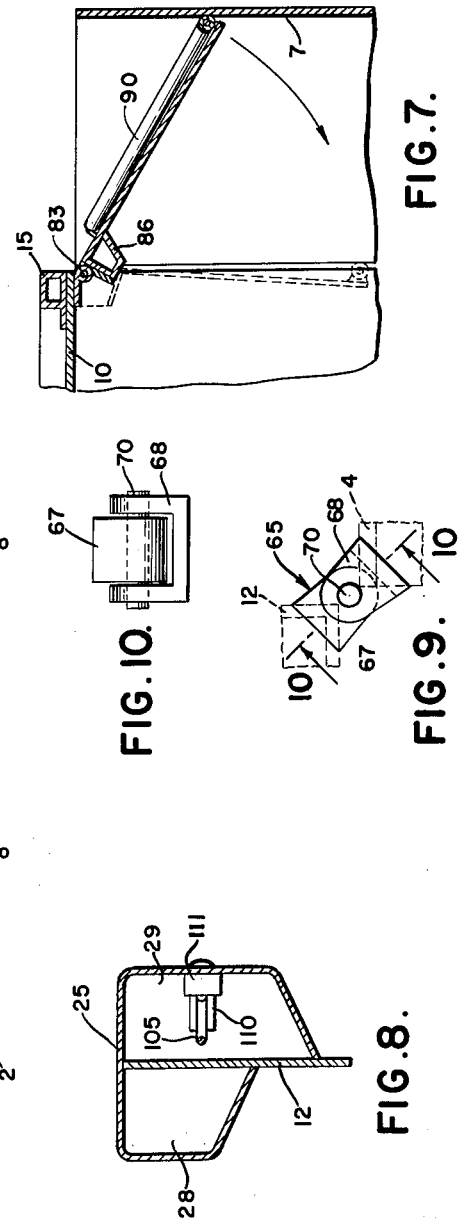
INVENTOR
Frank G. Lamb
BY *Thomas, Weisman & Russell*
ATTORNEYS March 5, 1963
F. G. LAMB
3,080,187
VINER TRUCK BODY
Filed Nov. 25, 1960
5 Sheets-Sheet 5
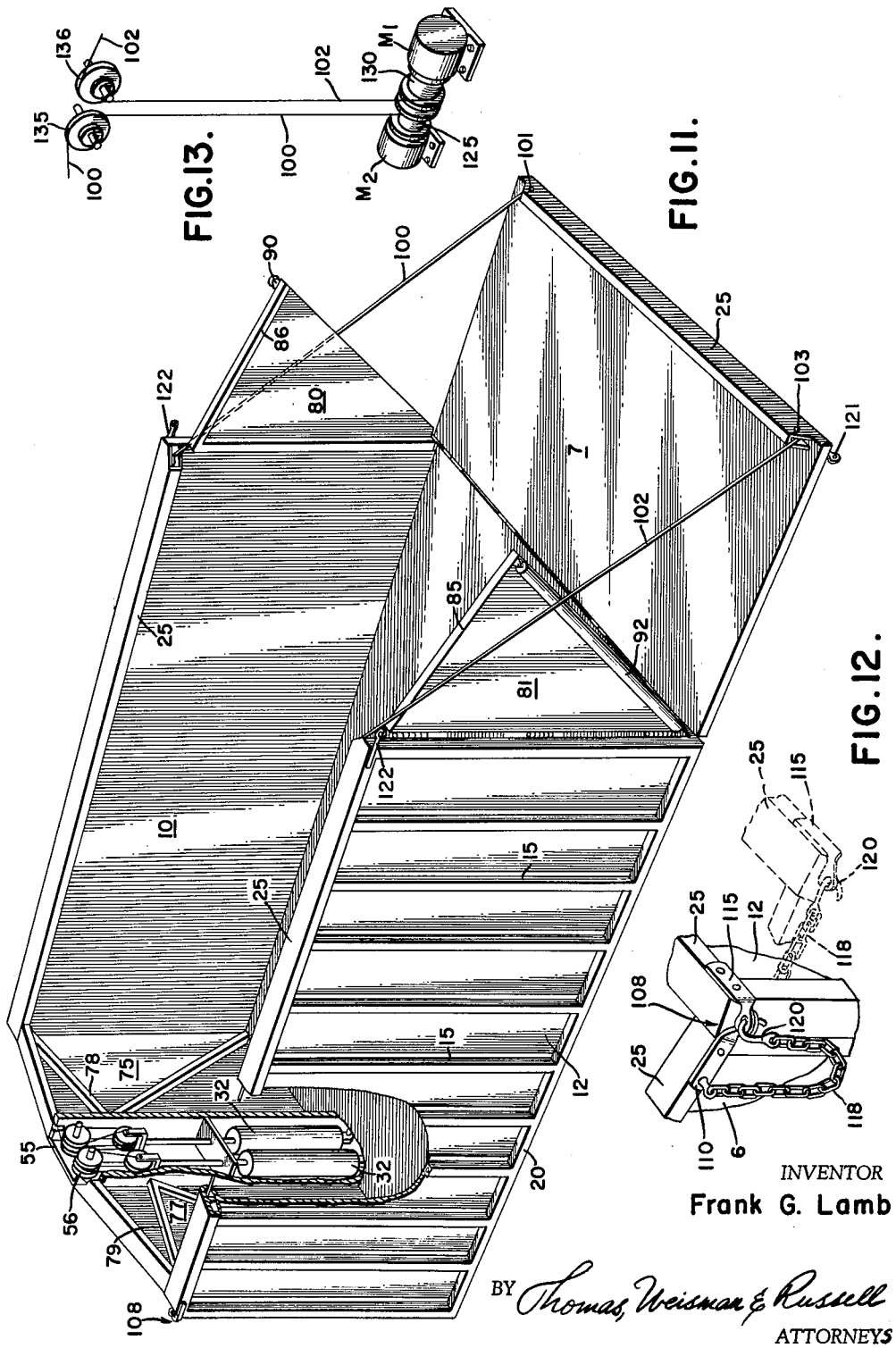
INVENTOR
Frank G. Lamb
BY *Thomas, Weisman & Russell*
ATTORNEYS – # United States Patent Office 3,080,187
Patented Mar. 5, 1963

3,080,187
VINER TRUCK BODY
Frank G. Lamb, Milton-Freewater, Oreg., assignor to Lamb-Weston, Inc., Weston, Oreg., a corporation of Oregon
Filed Nov. 25, 1960, Ser. No. 71,532
7 Claims. (Cl. 296—14)

This invention relates to what I prefer to designate as a viner truck body; more particularly, the involved invention is directed to a novel truck body arrangement that is more specifically designed for the conveyance of relatively loose, non-compacted materials, as vegetable bearing vines, or compressible materials which when initially charged to the truck, by their very nature, occupy a great deal of space. Hence, this invention is applicable to the farm equipment field where, for example, handling of extremely large quantities of so-called vine vegetables involves a material handling problem of considerable magnitude. In large produce farms there materials, such as pea vines, bean vines, etc., are removed from the field in their entirety, that is with the pods of the vegetable still remaining upon the vine. In such practice, the entire vine is removed and loaded into the truck where it is conveyed to the plant for adequate processing, such as podding, cleaning, freezing, cooking, canning, etc. Hence, in operations of the magnitude under consideration, trucking capacity in handling such materials becomes a practical as well as economic problem—the desire of course being to handle the maximum amount of vines with the minimum amount of mechanical equipment and manpower.

It is this problem to which the instant invention is primarily addressed—the problem of obtaining maximum storage capacity for the vines during the picking, yet compacting such vines in reasonable amount so that the truck body or conveyance may be able to conveniently travel upon and manipulate roads which, by ordinance, frequently limit the over-all width or height of any such conveyance.

As a practical matter, use of the involved invention results in a far more economical operation. In procedures heretofore employed, trucking of materials of the type mentioned involved extra manpower, for in compacting the load, one or two men were necessary to stamp down the vines as they were charged to the truck. Also, such manner of loading is manifestly laborious and time consuming, and hence results in economic loss.

The instant invention points to the solution of the difficulties encountered in such procedures by the provision of a truck body, adapted to be mounted upon almost any type of standard trucking equipment, which viner truck body is extensible and collapsible at the desire of the operator. Accordingdly, the body may be extended at the harvest site so that the maximum number of, for example pea vines, may be charged into the truck and then the sides and tailgate of the truck contracted or drawn towards each other to a vertical position to confine the truck to its normal size. At the same time and having in mind the type of material that is being handled, collapse of the truck readily compacts the greater amount of vines which are accommodated without injury thereto or injury to the product ultimately desired for processing, e.g., the consummable vegetable, peas, beans, etc. It is to be of course understood that the equipment is not confined solely to such products but also related items in the farming industry such as the loading, compacting and hauling of corn stalks or alfalfa, harvested for use as silage.

It is recognized that in the past designs have been formulated which permit extension of, for example, the size of a truck. Usually this type of contruction is adapted to such equipment as hay racks and not, in extended position, suitable for highway travel. Similarly, certain devices have been proposed which envisage contraction or expansion of a given truck body, but these are of a telescoping nature and of such type as to introduce many practical problems from a manufacturing and engineering standpoint. These devices, different in their mechanical arrangement, are also different in the solution of the aspect which has been previously referred to above—provision of a truck body that permits enlargement for loading purposes while at the same time all sides of the truck during periods of expansion thereof form a continuous and sealed rectangular enclosure. In the instant case, such continuous enclosure is provided for by sliding forward and tailgate elements that permit expansion or tilting downwardly in an outward direction, yet by suitable engagement or interlock with front and back, maintain the body as a complete and uninterrupted enclosure so that there is no danger of discharge of the conveyed material during conveyance and prior to unloading at the designated site.

Accordingly, it is a primary object of the instant invention to provide a truck body of the character referred to, designed to convey materials similar to those designated, wherein the side and end walls thereof may, by hydraulic or equivalent convenient mechanism, be simultaneously lowered or the cubic area of the body enlarged, while at the same time providing a complete, more or less rectangular enclosure, absent of any openings at the corners thereof which would permit unwanted discharge of the conveyed materials during transit.

It is a further object of the invention to provide equipment of this nature where, by very reason of the novel structure, the truck body may hold a substantially greater amount of such loose and non-compacted material than would be accomplished were the truck to be loaded with the sides and tailgate thereof simply in normal, vertical position. In this respect compacting takes place after such "excess" load so that as an over-all operation normal loads are exceeded, and hence normal transportation costs, substantially reduced. Additional manpower, otherwise necessary to compact the load, is thus eliminated.

It is another objective of the invention to provide such a truck body wherein each side of the truck may be independently lowered for discharge of the conveyed materials at that side; optionally the tailgate along may be lowered, through the same mechanical equipment, to provide for discharge at the end of the body after conveyance to the desired side; and finally, lowering of the sides and tailgate can be accomplished simultaneously, as well as simultaneously raised to vertical position for transport purposes. In these same aspects of the invention, an important function of this novel arrangement is the following: in large scale farming of the type here under consideration, such trucks are employed in the field and upon land contours often hilly in nature. Thus load balance often presents a problem. In the instant arrangement, any imbalance that may occur because the truck is located on a relatively steep incline can be accommodated by the lowering of a single side, e.g., a single side of the truck body in the direction of the incline. This operation produces a firm counterweight upon that side so that despite the incline the truck and load remain in full balance or sufficient balance to eliminate possibility of upset.

It is another object of the invention to provide a structure of the described type wherein all movable parts thereof are simply controlled by easily manipulated, automatic means which, as stated in the foregoing, permit lowering of one, two or all three sides of the conveyance at the will of the operator. Such mechanical means involves structure representing the essence of simplicity, and may involve hydraulic rams or hydraulically controlled winches, which, by means of suitable sheave arrangements, are connected to continuous and encircling wire ropes or cables that engage the sides and tailgate of the conveyance. These wire rope means, positioned along the top edges of each of these movable structures, and when slackened, permit downward progression of the side walls due to gravity. When tightened, such arrangement enables return of side walls and tailgate in an upward direction to vertical position.

Other advantages and objectives will be apparent from the description which follows.

The invention is more particularly shown in the following drawings appended hereto, wherein like numeral designations apply to like components of the structure and wherein:

FIGURE 4 is a front elevation view of the invention illustrating particularly the hydraulic ram device for individual lowering of each side and tailgate, and in dotted line, indicating corresponding outward movement of such side walls with upward or extended movement of the hydraulic means referred to;

FIGURE 6 is a longitudinal section view taken on the line 6—6 of FIGURE 3;

FIGURE 7 is a section view taken on the line 7—7 of FIGURE 6;

FIGURE 8 is an enlarged section view of the channel, reinforcing means of one side, illustrating the pulley or sheave for control of the involved cable, and taken on the line 8—8 of FIGURE 3;

Figure 3:
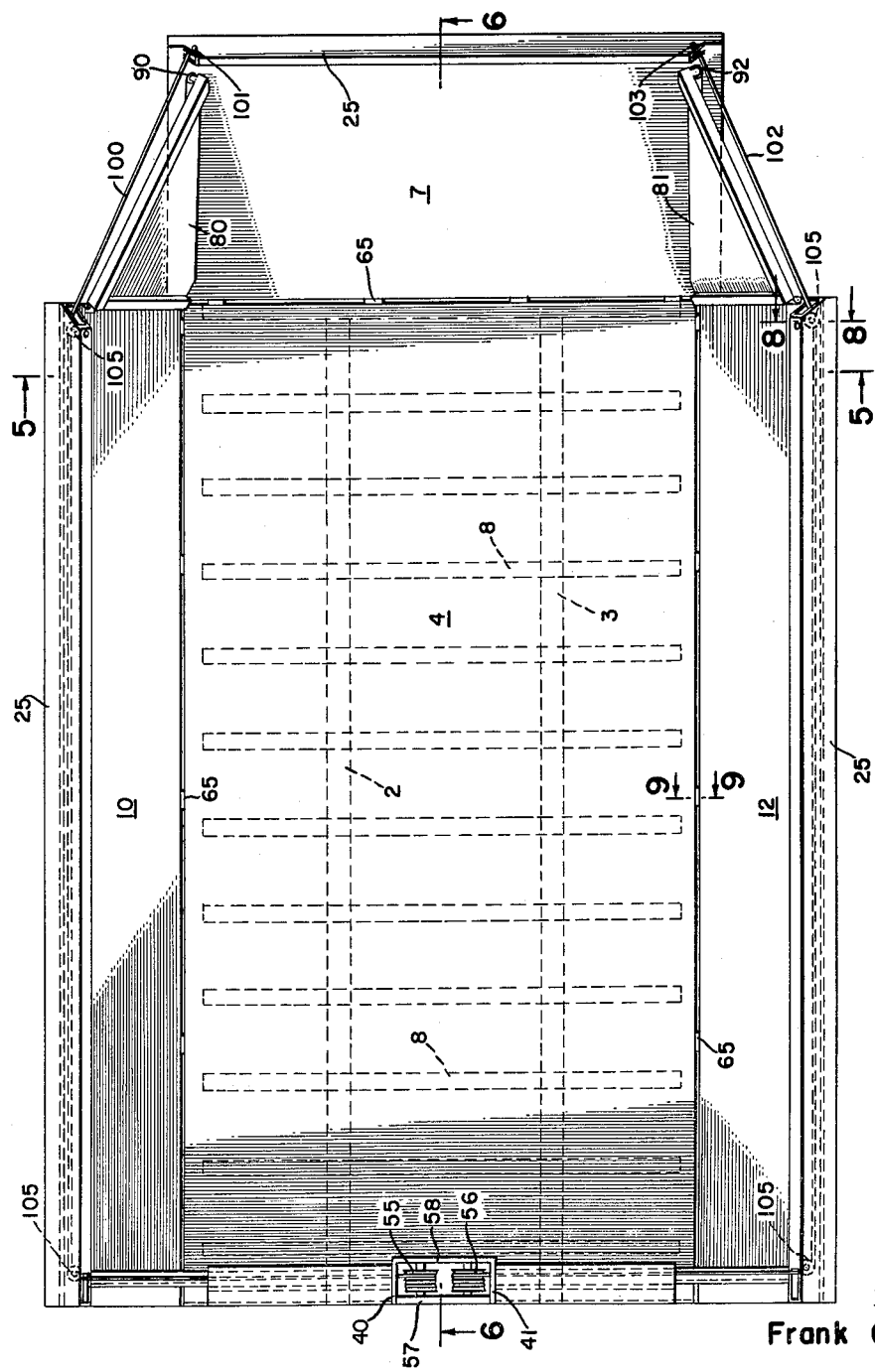
FIGURE 3 is a plan view of the invention, depicting the two side walls and tailgate in partially expanded or extended position and illustrating also the interfitting, sliding members at the respective ends of each of these side walls which, despite expansion, provide for a complete, self-contained enclosure.

FIGURE 9 is a section view taken on the line 9—9 of FIGURE 3 illustrating the typical hinge arrangement utilized with respect to side wall 12 as well as side wall 10;

FIGURE 10 is a section view taken on the line 10—10 of FIGURE 9;

FIGURE 11 is an additional perspective view of the invention illustrating the tailgate lowered to fully horizontal position with the side walls retained in vertical position;

FIGURE 13 is a perspective view of an alternate hydraulic mechanism for control of the cables which in turn enable raising and lowering of sides and tailgate; and FIGURE 12 is an enlarged perspective view of one form of locking arrangement to maintain the side walls in vertical position while the tailgate is lowered.

Figure 1:
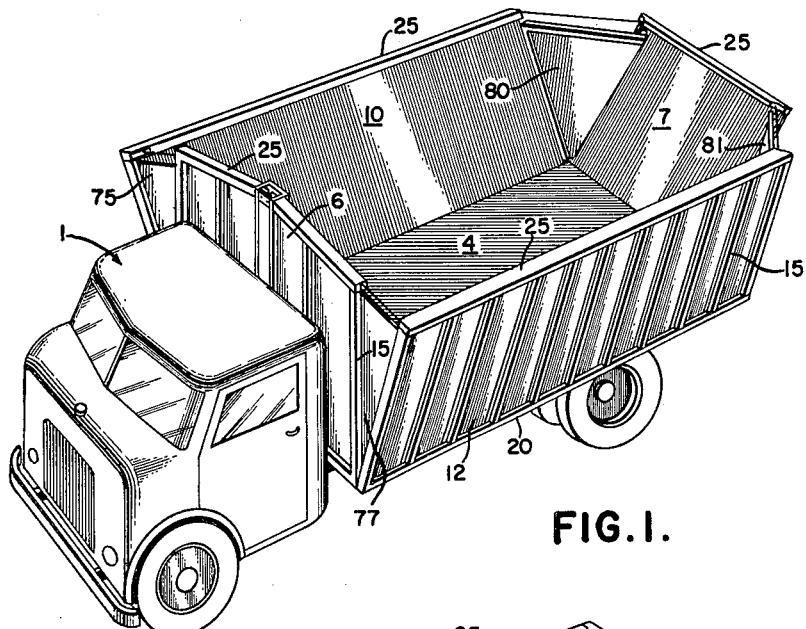
FIGURE 1 is a perspective view of the truck body of the invention shown in partially expanded position, and mounted upon the carrier of a given truck.
Figure 2:
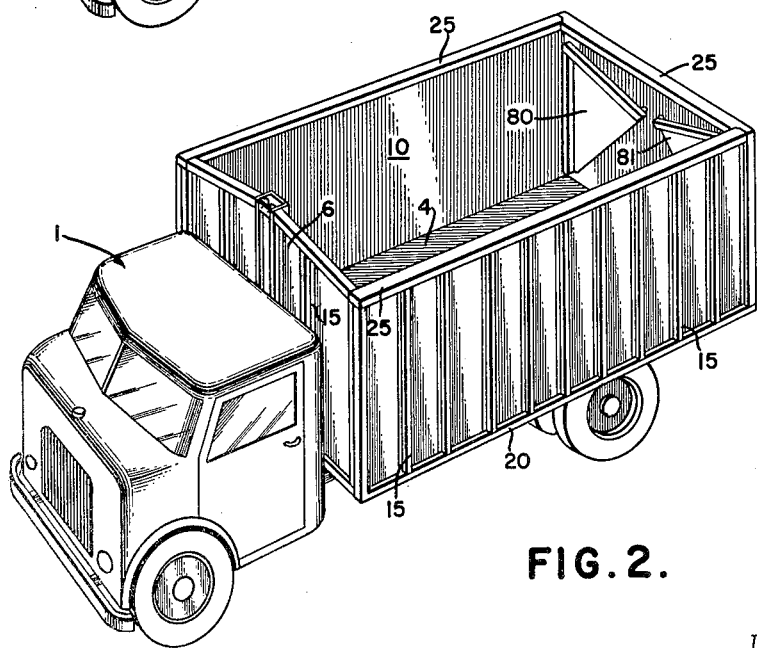
FIGURE 2 is a perspective view of the truck, similar to FIGURE 1, but illustrating the two side walls and tailgate as being withdrawn to vertical position for transport purposes.

Referring particularly to these drawings, it is seen that the truck itself is generally indicated at 1. The truck may be equipped with dump mechanism to tip the front end of the truck body upwardly for unloading, or be unequipped with such mechanism, in which latter case unloading is preferably effectuated by complete lowering of the tailgate. At any rate, the truck body is provided with the usual flooring 4, stationary front wall 6 and tailgate 7, as well as two side walls 10 and 12. Such side walls are arranged, as will be later described, for movement outwardly and downwardly, and the tailgate is likewise supported for outward and downward movement. In FIGURE 1 the truck body is depicted as being in such partially expanded position; hence, the side walls 10 and 12 have been permitted to move outwardly, and the tailgate to move outwardly in like fashion, so that the overall capacity of the truck is substantially increased in this partially open position. In FIGURE 2, side walls and tailgate are shown in withdrawn, upright posture.

In one embodiment of the invention, and as an example to gauge increased capacity, the truck body may have an over-all length of 16 feet, a width of 8 feet and a depth or height of 6 feet. The cubic foot capacity of the body when the side walls and tailgate are in upright position as shown in FIGURE 2 will thus approximate 750 cubic feet. As stated, substantial increase in capacity is achieved by loading the truck in its expanded state as shown in FIGURE 1. If it be assumed that the tailgate and side walls are moved outwardly to the relative extent illustrated in FIGURES 1 and 3 to 5, then the capacity will be increased approximately 100% or to about 1500 cubic feet.

Representative of a usual type of truck construction, the main frame basically consists of two longitudinal and parallel members 2 and 3; these in turn support cross elements of joists 8 which are positioned parallel to each other as shown in FIGURE 3, and transverse to the two subframe members 2 and 3. The referred to floor 4 is positioned directly upon and secured to these joists 8.

For additional strength, each of the side walls, as well as tailgate, may be fitted with exterior, parallel T-bars or equivalent elements 15, equally spaced one from the other, and interconnecting at their lower portions with a bottom frame member 20 which is affixed to the lower edge of front, sides and tailgate. At their upper ends the elements 15 interfit with a hollow strengthener 25, such top piece or brace of the sides also accommodating interiorly thereof the wire rope or cable which is utilized to accomplish lowering of sides and tailgate as well as reversely positioning the same in upright position.

Means for control of the wire rope which in turn accomplishes lowering and raising of these movable portions of the truck body is found, in one form of the invention, in the hydraulic cylinders 30 and 32 which are pivoted as at 34 and 36 to the frame of the truck body. The thrust rods 30a and 32a of these cylinders are provided with sheaves 44 and 45. Two wire ropes respectively engage pulleys 44 and 45 and sheaves 55 and 56. They pass through the several members 25 at the top of sides and tailgate, and each are fastened to a side of the latter. The sheaves may be separated from the hydraulic media by plate 42 and the equipment just referred to enclosed within side elements 40 and 41 positioned within the front wall 6 of the truck body, and further enclosed by front and back plates 57 and 58, respectively.

Figure 4:
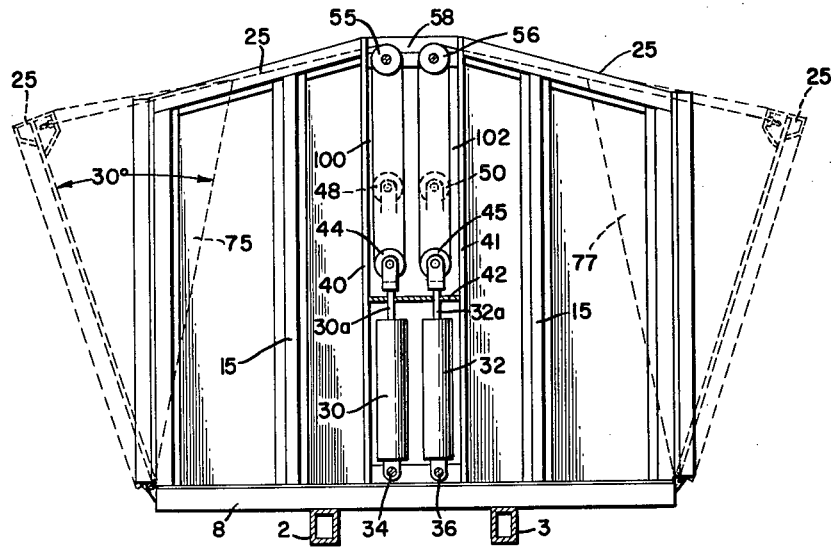

With reference to FIGURE 4, it is seen that expansion of the cylinders and upward movement of pulleys 44 and 45 to a position shown in dotted lines at 48 and 50 will result in slacking off the respective cable to such an extent that the sides of the truck body are opened or moved outwardly to the position also shown in dotted line in this figure (FIGURE 4).

As stated above, the structure of the truck body is such that even when the sides and tailgate are so expanded outwardly, the interior of such body is completely closed to the exterior; in other words, structure has been provided which seals off that triangular opening at each corner of the truck which would normally be opened upon outward extension of sides and tailgate.

In this form of invention the sealing means at the forward end of the truck body take the form of two triangular elements 75 and 77, each of which is provided with edge stiffening elements 78 and 79. The triangular, laterally moving members 75 and 77 are secured to the respective side walls 10 and 12 in a position right angular thereto and in such manner, as will be well known to the art, as to rigidly secure these members 75 and 77 in this position, i.e., right angular to the respective side walls but rearwardly of, closely adjacent to, and parallel to the front wall 6. Thus, the triangular member is so secured to side wall 10, and triangular member 77 similarly mounted upon side wall 12. It will thus be appreciated that upon lowering or raising of the sides, the elements 75 and 77 are closely adjacent to and positioned to move inwardly and outwardly in parallel relationship with respect to the front wall 6 and, as will be well understood, closely adjacent to said front wall.

In the preferred embodiment of the invention, it has been found that the comparative dimension of such sliding members as 75 and 77 should be based upon a triangular configuration wherein the angle at the bottom of each member approximates 30 degrees. In other words, and viewing FIGURE 4, the relative dimension can be seen in dotted line of both members 75 and 77, the lower apex of these triangular elements in each instance being at the bottom or at the pivot point where they are secured to the floor 4 of the truck body. From this outline of the construction of these side elements, it will be appreciated that upon upward movement of the referred to hydraulic rams 30 and 32, the wire rope has permitted movement of such sliding members to the relative position shown in dotted line in that figure.

As indicated, separate wire ropes are connected to each rod of the respective hydraulic cylinders. Thus, the wire rope 100 engages the sheave 44 of the hydraulic ram 30 and the wire rope 102 engages the sheave 45 of the hydraulic ram 32. Such cables are then threaded through the sheaves 55 and 56, respectively, in a manner shown in FIGURE 4. They then run through appropriate pulleys in the four corners of the sides and are then attached to the respective two corners of the tailgate to permit lowering and raising of all three elements.

Accordingly, pulleys 105 are located in each upper corner of each side of the truck body (see FIGURE 3). The wire rope 100 then is affixed to the tailgate by a securing pin 101, and the wire rope 102 similarly affixed to the opposite corner of the tailgate by the pin 103.

It will be noted that the top edge of the front wall 6 of the truck as well as the top edge of the side walls 10 and 12 and the tailgate 7, are all provided with the same type of strengthener or rib element 25 of hollow configuration. These members or ribs 25 are more accurately shown in a cross section in FIGURE 8 where it is seen that they comprise simply a roughly rectangular shape, in cross section. Preferably made of sheet steel, the side wall, as in this instance 12, bisects such element so that two hollow passageways 28 and 29 are provided. These ribs may be welded or otherwise suitable secured to the particular side wall involved or to the top of the tailgate. At any rate, referring to the manner in which the wire rope is threaded through side walls and tailgate and referring also to the four corners which are provided with suitable pulleys to accommodate such cables, FIGURE 8 depicts the typical position of such pulley 105 in the rear righthand corner of the truck body (see FIGURE 3). Such pulleys are rotatably supported upon a suitable yoke 110, the base 111 of which can be riveted or otherwise attached to the involved side or end wall. The construction is the same with respect to each corner, the pulleys 105 in each instance permitting the cable to turn the corner and run free when side walls and tailgate are either lowered or raised. Furthermore, the structural element 25 is such as to not only additionally support the upper edge of each wall but, as stated, offers an open passageway 29 within which the cable is permitted to run without obstruction, and since entirely covered, without possibility of jamming or interference by the load itself or any other exterior element.

Both sides and tailgate are pivoted to the floor 4 through usual means such as a series of hinge elements 65. Such hinges may take the form as shown in FIGURES 9 and 10 where a U-shaped lug 68 is secured to the floor 4. This lug is adapted to receive an apertured hinge plate 67 which is secured to the respective side wall, or to the tailgate. A hinge pin 70 is passed through the apertures in the U-shaped element 68, and in the plate 67, thus forming a simplified hinge suitable for these purposes. The hinges 65 are evenly spaced from each other as indicated in FIGURE 3.

A corner closure similar to the forward pieces 75 and 77 is provided with respect to those corners between each side wall and the tailgate.

Figure 5:
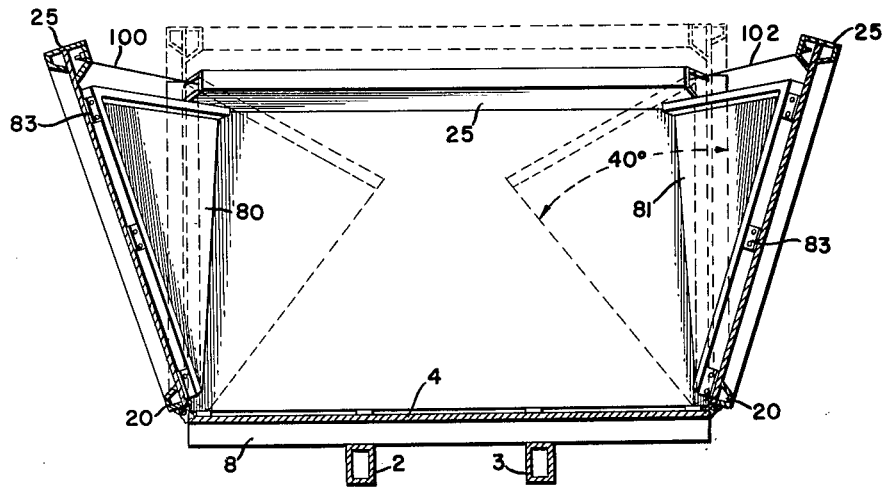
FIGURE 5 is a transverse section taken on the line 5—5 of FIGURE 3.

Referring to FIGURE 5, rear corner closures are indicated at 80 and 81 respectively. In order for the truck to open to the position indicated in FIGURE 1, and with respect to the relative dimensions of this embodiment in the truck as set forth in the foregoing, these triangular segments, it has been found, should involve at their lower apex an angle of about 40 degrees. Such an angle is indicated in FIGURE 5.

With lowering of the tailgate and with opening of the side walls of the body, it is apparent that some means must be provided for smooth and uninterrupted contact with the tailgate 7. In this form of the invention, such media is found in one or more rollers 90 which are located upon the inner side (when folded) of each triangular insert 80 and 81. As shown in FIGURE 7, these triangular members are stiffened by braces and ribbed elements 86, which are hollow, similar to members 78 and 79 at the forward end, and which in the present instance afford suitable room for attachment of a series of hinges 83, the opposite side of the hinge plate in each instance being secured to the inner side of the respective side wall—as shown in FIGURE 7, side wall 10.

With upward movement of the two ram elements and consequential release or slacking off of the wire rope, it will thus be appreciated that each of these rear triangular corner elements 80 and 81 will gradually open or diverge outwardly, the rear side of each sliding upon the roller 90 and 92 along the interior surface of the tailgate 7 until the open poistion has been attained as it is shown in FIGURES 1, 3 and 6, and graphically illustrated in FIGURE 7. Naturally with reverse movement of the hydraulic presses 30 and 32, the respective wire ropes 100 and 102 are moved or withdrawn in a reverse direction, so that the tailgate 7 is returned to the upright and the two side walls 10 and 12 are also positioned vertically. During such movement the corner elements 80 and 81 which have just been described, through the respective rollers 90 and 92, again slide along the inner surface of the tailgate until they assume the position shown in FIGURE 2.

Mention has been made in the foregoing of complete lowering of the tailgate, or at least lowering to a horizontal position, for unloading purposes. Such operation is illustrated in FIGURE 11, where the tailgate has been positioned horizontally by extension of the two cables, whereas the two side walls 10 and 12 remain erect.

In order to accomplished this function, i.e., opening of the tailgate without consequent rotation outwardly of this side walls, a suitable lock is used to lock such side walls in upright position. Such lock, generally indicated at 108, is located at the forwarding intersecting corners of the front wall 6 and the respective side walls 10 and 12 of the truck body.

One example of a lock which may be employed is illustrated in FIGURE 12. Here two hasps 110 and 115 form the interlock. The hasp 110 is affixed to the upper edge or member 25 of the front wall 6 and the hasp 115 to the top piece 25 of the side wall 12 in a manner well understood in the art. Each hasp is made integral with a latch device or extension having an appropriate opening therein and each hasp so formed, as indicated in FIGURE 12, that when side wall and front wall of the truck body are in the position shown in FIGURE 11 the two mentioned apertures coincide. The hasp 110 may provide support for an appropriate chain 118 to which is attached a suitable pin or hook 120 designed to engage both openings of the respective hasps and hence interlock the two and the respective side wall and front wall together, preventing any outward movement thereof.

Accordingly, when the respective cables are slacked off by means of the pulley arrangement, the side walls may be maintained in vertical position with the only consequent operation being lowering of the tailgate, as shown in FIGURE 11.

On the other hand, it may be desired to open or outwardly rotate each side wall to the position shown in FIGURE 1 and still lower the tailgate to its fullest extent or to the horizontal position shown in FIGURE 11. If this operation be desired, then the operator simply disengages the closed interlock as it is shown in solid line in FIGURE 12 and places the hook 120 into the single opening of the hasp 115. As shown in dotted line in FIGURE 12, the length of the chain 118 may be such as to permit the side walls to extend outwardly to the extent indicated in FIGURE 1. Further extension of the cables 110 and 102 through the hydraulic mechanism previously mentioned will then permit lowering of the tailgate to any desired extent with the side walls in this extended position, but without further outward movement.

It may also be desired to so operate the structure that tailgate 7 and one side wall are maintained erect, with one side wall lowered. In this event one cable will be pulled up taut and one slackened to permit lowering of one side. The tailgate may be further locked in upright position, during this maneuver, by suitable interlock consisting of apertured hasps 121 and 122. The former is secured to the upper, rear edge of each side and the latter to the upper side edge of the tailgate (see FIGURE 11). When the tailgate is upright, the apertures of the hasps are arranged to coincide, and then locked together, in this instance upon one side, by an interfitting pin, as will be well understood.

It is to be also observed that when the tailgate is down as shown in FIGURE 11, the wire ropes 100 and 102 retain or guide the respective triangular side closures 80 and 81 therebetween, facilitating rolling contact thereof with the tailgate when the latter is pulled or returned to upright position.

Referring to FIGURES 6 and 11, the pulleys in the front of the truck body, namely pulleys 44, 45 and 55, 56, may be double or triple sheaved, as may be required for proper extension of side walls and tailgate.

At any rate, with complete outward extension of both sides and tailgate, it may be desired to utilize equipment other than the hydraulic rams illustrated, in order to assure a full amount of wire rope for this purpose, it being understood that a considerable amount of cable must be slacked off to accommodate such outward extension of all three of these elements, and particularly where the tailgate is not only lowered horizontally to the extent shown in FIGURE 11 but even to a position where the same extends downwardly with respect to the horizontal axis of the truck body. In such instance, the alternate equipment for this purpose may take the form of two winches 125 and 130, as shown in FIGURE 13. These may be respectively driven by two motors M-1 and M-2, the mounts of which can be secured in an appropriate manner within the plates 40, 41 in the front wall. Such motors, if of the electric type, should be reversible for obvious reasons. If hydraulically driven, then of course they can be reversed in known fashion. In any event, each of the referred to winches is of a size to accommodate a fully adequate amount of cable wound thereupon. When unwound, quite obviously the extension procedure occurs; and when such motors are reversed and the cables rewound upon the respective winches, tailgate and side walls may be simultaneously or individually raised to any degree, or until the final upright state is reached, as shown in FIGURE 2.

When using winches for this purpose, it is apparent that only two pulleys 135 and 136 (FIGURE 13), as alternates to any multiple sheaved pulleys 55 and 56, may be required, there being no necessity in this case for a double or triple sheave arrangement.

From the foregoing, it should be understood that the operator of the truck body of this invention has within his control, and at his option, various procedures. One side may be lowered with the other side and tailgate in upright position, in which case the other side is locked in place through the mechanism shown in FIGURE 12 and the tailgate locked in place through the lock arrangement 121—122 in upright position. This positioning may be preferred for initial loading.

Alternatively, the operator, for loading purposes, may extend all three elements to the open position shown in FIGURE 1.

After loading the truck body may be retracted to the position shown in FIGURE 2 and transited to point of discharge.

At the latter point and for unloading purposes, both sides may be retained in upright position and only the tailgate lowered to the desired extent.

Again, through the securing means illustrated in dotted line in FIGURE 12, the two sides may be rotated outwardly to the extent indicated in FIGURE 1, and the tailgate rotated downwardly to horizontal position or position below horizontal.

All of these factors, and the mechanical arrangement herein disclosed, contribute to extreme flexibility; at the same time the primary function of the assembly is attained—that is, the function of doubling the capacity of the truck body for loose, non-compacted and compressible materials without the manpower requirement for tamping down such materials, as would be required in the ordinary type of non-adjustable truck body.

Although the invention has been illustrated by reference to a specific structure found practical in actual operation, it is intended that various changes and modifications may be made within the scope of the following claims.

I claim:

1. In a viner truck body, the combination of a front wall, pivoted side walls, and a pivoted tailgate, said walls and tailgate being mounted for outward and downward movement, means to rotate said side and end walls outwardly and downwardly, said means comprising a cable means extending from said front wall through each of said side walls and affixed to said tailgate, said cable means having means in association therewith for the extension and retraction thereof, a triangular closure means affixed to the forward end of each side wall and right angularly disposed with respect thereto, said triangular closure means extending between said side walls and said front wall, and vertically pivoted closures pivoted to the rear ends of each of said side walls and positioned between said side walls and said tailgate, said closure means and said pivoted closures closing the corners of said truck body when said sides and tailgate are extended outwardly and downwardly by said cable means.

2. The combination as set forth in claim 1 wherein pulley means to accommodate said cable means are positioned in the upper corners of said side walls, said cable means being in free running engagement with said pulley means.

3. A combination as defined in claim 1 wherein a lock means is provided between each of said side walls and said front wall to permit lowering of said tailgate without lowering of said side walls.

4. A combination as defined in claim 3 wherein said triangular closure means are positioned parallel to said front wall for movement adjacent thereto, and said vertically pivoted closures have rollers on the inner edges thereof, said rollers being adapted for engagement with the inner side of said tailgate during the lowering and raising thereof.

5. A combination as defined in claim 2 wherein said extension and retraction means comprises hydraulic cylinders positioned in said front wall and connected to each of said cable means in each of said side walls.

6. A combination as defined in claim 2 wherein said extension and retraction means comprises winches in said front wall connected to each of said cable means in each of said side walls.

7. In a truck body having a floor and normally upright front, side and end walls, said side walls being pivoted to said floor at their respective lower edges, means to tilt said side walls angularly and outwardly to increase the cubic capacity of said truck body, the forward end of each of said side walls having right angular projections attached thereto, said projections being disposed adjacent and parallel to said front wall, each of the rear ends of said side walls having triangular closure members pivoted thereto for slidable engagement with said end wall, said triangular closure members having rollers on the inner edges thereof, said rollers being adapted for engagement with the inner side of said end wall during the raising and lowering thereof, said tilting means including two hydraulic ram means each of which is interconnected with said front wall, one of said ram means being operatively interconnected with one of said side walls and the other of said rams being operatively interconnected with the other of said side walls, whereby upon extension of said ram means said respective side wall is extended outwardly and upon retraction thereof said respective side wall is returned to normal upright position, said ram means providing for independent movement of said side walls, said right angular projections and said triangular closure members forming with said side and end walls a continuous and complete enclosure despite outward movement of said side walls.

References Cited in the file of this patent

UNITED STATES PATENTS

| | | |
|---|---|---|
| 894,336 | Mills | July 28, 1908 |
| 1,134,258 | Curtis | Apr. 6, 1915 |
| 1,136,643 | Berryman | Apr. 20, 1915 |
| 1,619,504 | Gabriel | Mar. 1, 1927 |
| 2,431,588 | Sharpe | Nov. 25, 1947 |

FOREIGN PATENTS

| | | |
|---|---|---|
| 1,018,721 | France | Oct. 15, 1952 |
| 716,699 | Germany | Jan. 27, 1942 |